(12) United States Patent
Tawa et al.

(10) Patent No.: US 9,457,451 B2
(45) Date of Patent: Oct. 4, 2016

(54) METHOD OF MANUFACTURING A GEAR

(71) Applicant: Toyota Jidosha Kabushiki Kaisha, Toyota-shi, Aichi (JP)

(72) Inventors: Hiroyoshi Tawa, Okazaki (JP); Masahiko Mitsubayashi, Nagoya (JP); Hideyuki Sakaue, Aichi-gun (JP); Keisuke Kadota, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 52 days.

(21) Appl. No.: 14/539,695

(22) Filed: Nov. 12, 2014

(65) Prior Publication Data

US 2015/0068039 A1 Mar. 12, 2015

Related U.S. Application Data

(63) Continuation of application No. 13/821,636, filed as application No. PCT/JP2010/065482 on Sep. 9, 2010, now abandoned.

(51) Int. Cl.
*B24C 1/10* (2006.01)
*B23P 9/00* (2006.01)
*F16H 55/06* (2006.01)
*F16H 55/17* (2006.01)

(52) U.S. Cl.
CPC . *B24C 1/10* (2013.01); *B23P 9/00* (2013.01); *F16H 55/06* (2013.01); *F16H 55/17* (2013.01); *Y10T 29/49462* (2015.01)

(58) Field of Classification Search
CPC ............. B23P 9/00; B24C 1/10; F16H 55/06
USPC .......................................................... 29/893
See application file for complete search history.

(56) References Cited

U.S. PATENT DOCUMENTS

2006/0161141 A1   7/2006   Chernyak

FOREIGN PATENT DOCUMENTS

| JP | 61-265271 A | 11/1986 |
| JP | 2000-317841 A | 11/2000 |
| JP | 2002-030344 A | 1/2002 |
| JP | 2006-161141 A | 6/2006 |
| JP | 2007-262506 A | 11/2007 |
| JP | 2007-307678 A | 11/2007 |
| JP | 2009-127842 A | 6/2009 |
| JP | 2010-115752 A | 5/2010 |

*Primary Examiner* — Alexander Polyansky
(74) *Attorney, Agent, or Firm* — Kenyon & Kenyon LLP (57) ABSTRACT

The problem of the present invention involves providing a gear that has high tooth-root bending strength and for which there is no chipping of the tips of the teeth. Accordingly, the surface of the gear is carburized and the gear is strengthened by imparting residual stress, with the residual stress in the region with a surface depth of 5 μm to 20 μm being −1000 MPa or less, and the residual stress in the region with a surface depth of 50 μm to 150 μm being −1000 MPa or greater.

2 Claims, 8 Drawing Sheets

| | Experimental results of Chipping (O: No cracks, X: Some cracks) |
|---|---|
| Shot peening treatment test (1) (φ 0.8, HV800) | X, X, X, O, X, O, O, X |
| Shot peening treatment test (2) (φ 0.8, HV580) | O, O, O, O, O, O, O, O |
| Present invention (φ 1.4, HV580+ φ 0.2, HV800) | O, O, O, O, O, O, O, O |

METHOD OF MANUFACTURING A GEAR

CROSS REFERENCE TO RELATED APPLICATIONS

This is a continuation of U.S. application Ser. No. 13/821,636, filed on 8 Mar. 2013, which is a 371 national phase application of PCT/JP2010/065482 filed on 9 Sep. 2010, the entire contents of which are incorporated herein by reference.

FIELD OF THE INVENTION

The present invention relates to a gear strengthened by applying residual stress to the gear having a carburized surface.

BACKGROUND OF THE INVENTION

Patent Document 1 discloses, for the purpose of easily improving the fatigue strength of mechanical parts or components, a carburizing treatment process on a gear, a nitriding treatment process on the gear, a first shot peening process for shot peening the gear using shot particles with a shot particle diameter of 0.8 mm, and a second shot peening process for shot peening the gear using shot particles with a particle diameter of 0.1 mm.

Patent Document 2 discloses, for the purpose of modifying the surface of alloy steel for mechanical structure, a first shot peening process for shot peening using shot particles with a shot particle diameter of 0.6 mm, which is conducted after a vacuum carburizing treatment and a heating and rapid cooling treatment for ultrahigh-speed and short time, and a second shot peening process for shot peening using shot particles with a shot particle diameter of 0.08 mm.

In the techniques of Patent Documents 1 and 2, the residual stress in a region located at a depth of 20 μm or less from the surface is adjusted to −1400 MPa to increase tooth-root bending fatigue strength. That is, the stress (compressive stress) of −1400 MPa or less is left in the region at a depth of 20 μm or less from the surface. When repeated stress on teeth acts as a large repeated stress on the surface(s) of a tooth or teeth root(s), this repeated stress is canceled out by the residual stress. Thus, fatigue strength is increased.

RELATED ART DOCUMENTS

Patent Documents

Patent Document 1: JP-A-2007-262506
Patent Document 2: JP-A-2002-030344

SUMMARY OF INVENTION

Problems to be Solved by the Invention

However, the conventional gears cause the following problems. Firstly, gear strength depends on fatigue fracture of tooth surface caused by contact surface pressure in addition to the tooth-root bending fatigue strength. However, Patent Documents 1 and 2 fail to consider a problem with the contact pressure fatigue strength.

Secondly, when the region at a depth of 20 μm or less from the surface is applied with higher residual stress in order to enhance the tooth-root bending fatigue strength, this leads to a problem with tooth-tip chipping.

Figure 8:
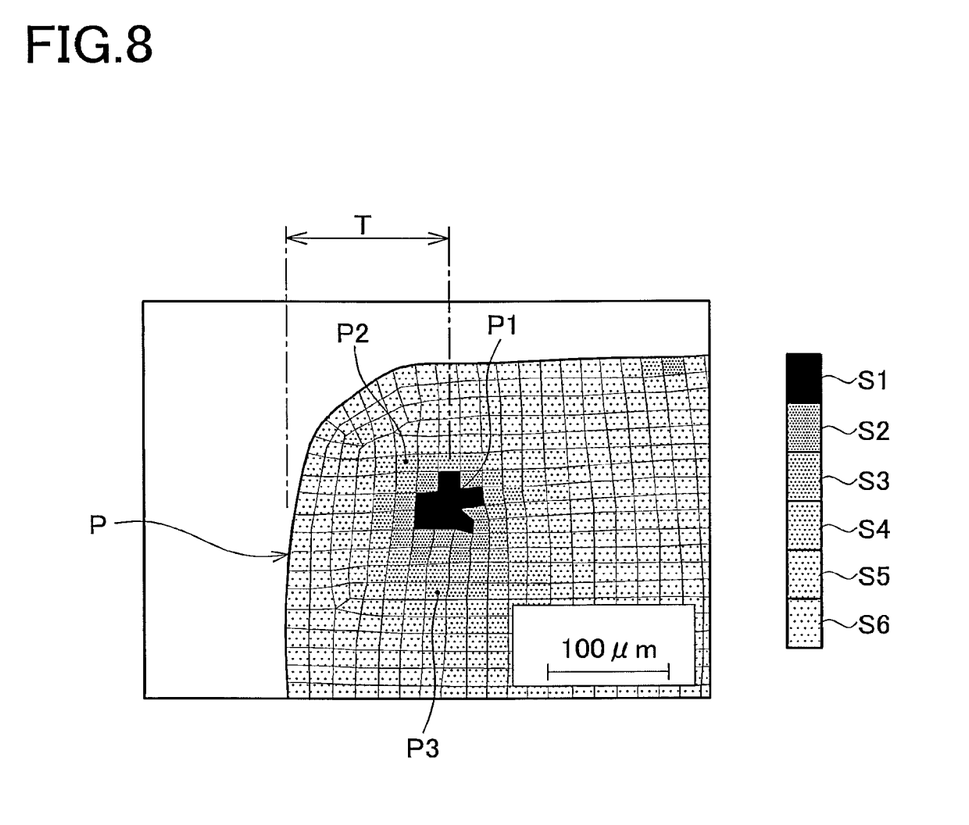
FIG. 8 is a distribution diagram of strain in CAE analysis on a cross section of a tooth tip of a gear subjected to a conventional shot peening.
Figure 12:
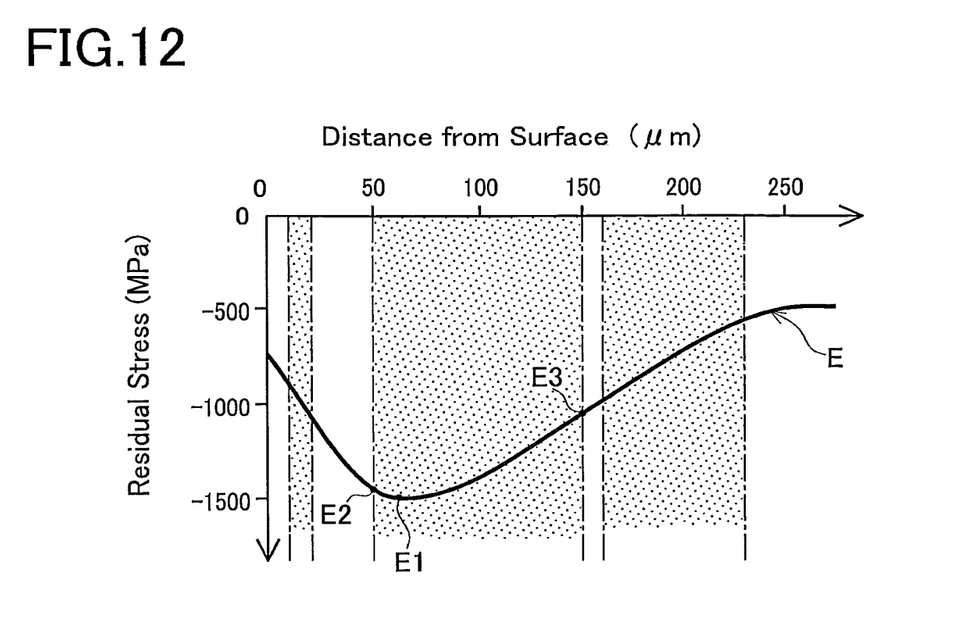
FIG. 12 is a distribution diagram of residual stress in a gear in a shot peening treatment test (2)

To be concrete, FIG. 8 shows a CAE analysis result of a gear when a shot peening treatment test (1) which is conventionally performed to increase the tooth-root bending fatigue fracture. The analysis result in FIG. 8 is obtained in a simulation analysis performed in such a manner that a gear is carburized to a hardness of HV750 and shot particles each having a particle diameter of 0.8 mm and a hardness of HV 800 are caused to impact or shot peen the gear so that shot dents overlap one another by three-quarters of the particle diameter. FIG. 12 shows a distribution diagram of residual stress in a gear in the shot peening treatment test (1).

As shown in FIG. 8, it is found that a region P1 located at a depth T of 100 μm from the surface P has a strain at maximum level S1. Strain level is larger toward S1 and smaller toward S6. It is further revealed that a region P2 located at a depth of about 50 μm from the surface P and a region P3 located at a depth of about 150 μm from the surface P (from an upper side in the figure) each has a strain at a level S3 or more.

As shown in FIG. 12, a solid line E indicates that the residual stress in regions E2 to E3 located at a depth of 50 μm or more but 150 μm or less from the surface P is larger than that in other regions. Furthermore, a peak position E1 also exists in the region at a depth of 50 μm or more but 150 μm or less from the surface P.

Figure 9:
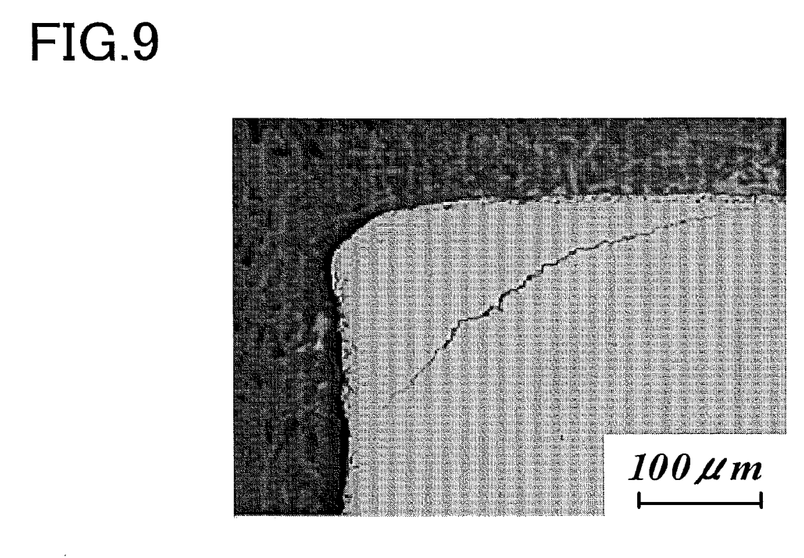
FIG. 9 is a micrograph with a scale showing a cross section of the gear tooth-tip in FIG. 8.

In addition, a tooth-tip cross section of a gear immediately before a tooth tip is chipped is checked by a micrograph shown in FIG. 9. This shows, as traced in FIG. 10, that inner cracks Q occur in a region located at a depth of 100 μm from the surface U corresponding to the region P1 having a S1-level strain. This also reveals that an inner crack Q1 near a region located at a depth of 100 μm from the surface U has a wide width. This reason why the width of the inner crack Q1 near the region at a depth of 100 μm from the surface U is wide is conceivably in that the strain in the regions P2 and P3 surrounding the region P1 shown in FIG. 8 has a strain at level S3 or more and thus the inner crack is widened.

Figure 13:
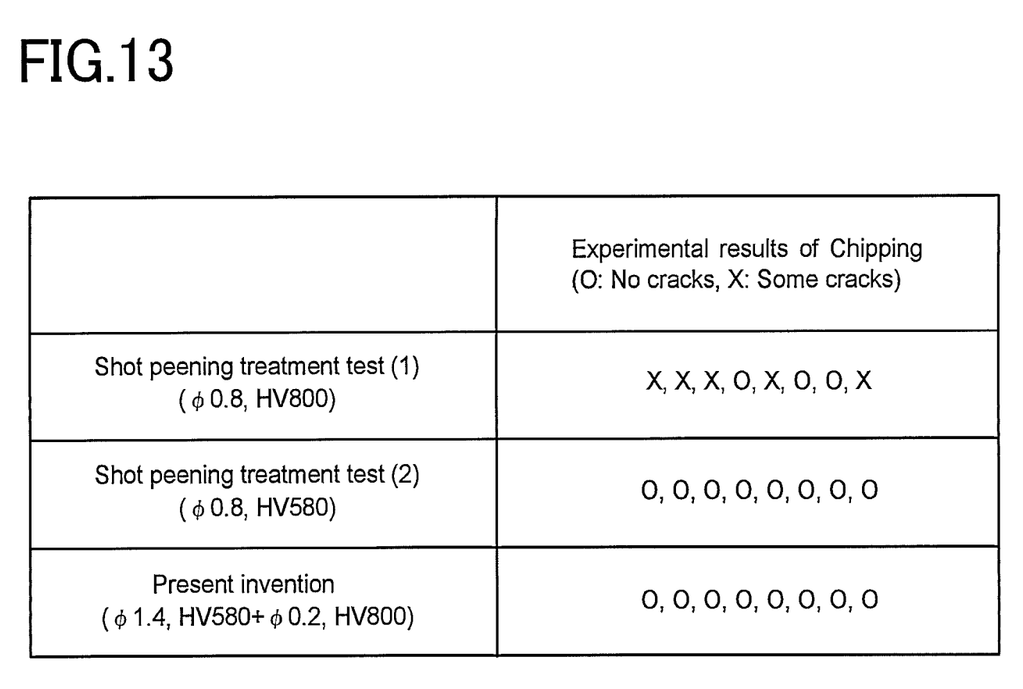
FIG. 13 is a table showing experimental results of tooth chipping.

As shown in FIG. 13, in the shot peening treatment test (1), cracks occur in five of eight gears.

Specifically, in the conventional shot peening treatment test (1), it is found that excessively increasing the residual stress to enhance the fatigue strength of tooth-root bending caused strain in the region located at a depth of 50 μm or more but 150 μm or less from the surface, resulting in the occurrence of inner cracks therein.

Figure 11:
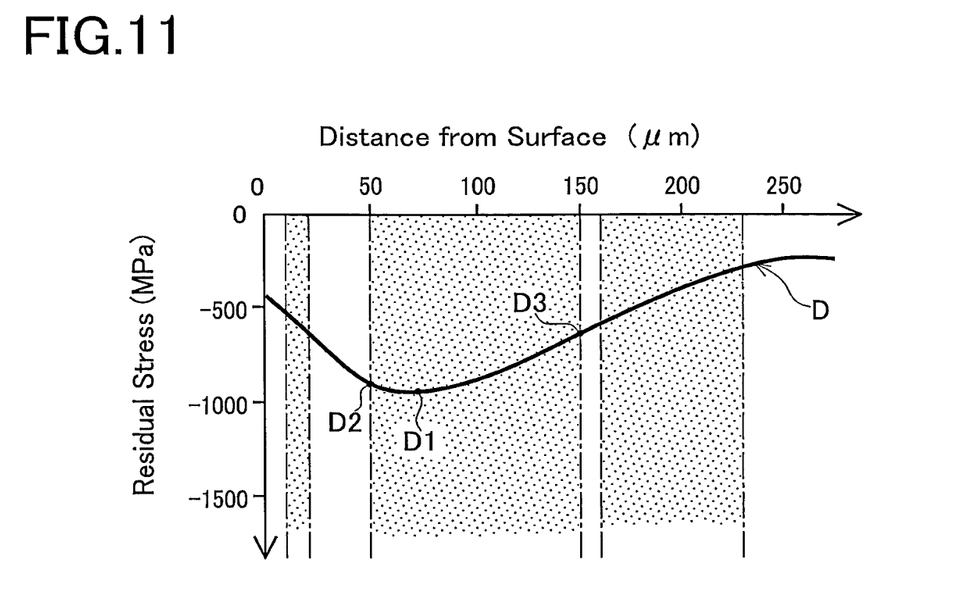
FIG. 11 is a distribution diagram of residual stress in a gear in a shot peening treatment test (1)

On the other hand, the inventors of the present invention performed a shot peening treatment test (2) to prevent the inner cracks by reducing the residual stress as indicated by a solid line D in FIG. 11 in the region at a depth of 50 μm or more but 150 μm or less from the surface. The shot peening treatment test (2) shown in FIG. 11 is conducted using shot particles with particle diameter of 0.8 mm and hardness of HV580. In this shot peening treatment test (2), the residual stress in regions D2 to D3 at a depth of 50 μm or more but 150 μm or less from the surface could be reduced as compared with that in the shot peening treatment test (1) shown in FIG. 12. Further, a peak position D1 could also be made lower than the peak position E1.

Therefore, as shown in FIG. 13, inner cracks did not occur in all eight gears in the shot peening treatment test (2).

In the shot peening treatment test (2), the residual stress in the region at a depth of 50 μm or more but 150 μm or less from the surface could be reduced, whereas the residual stress became small in a region at a depth of 20 μm or less from the surface, which needs sufficient tooth-root bending strength, and a region at a depth of more than 160 μm but 230 μm or less from the surface, which needs sufficient strength to fatigue fracture of tooth surface by contact surface pressure. Thus, a problem with insufficient strength occurs.

As above, all of the tooth-root bending fatigue strength and the tooth-surface fatigue strength by contact surface pressure could not be increased.

The present invention has been made to solve the above problems and has a purpose to provide a gear configured with high tooth-root bending strength and without causing tooth-tip chipping.

Means of Solving the Problems

To achieve the above purpose, one aspect of a gear of the invention provides the following configuration.
(1) In a gear including a carburized surface and strengthened by application of residual stress to the gear, the residual stress in a region at a depth of 5 μm or more but 20 μm or less from the surface is −1400 MPa or less so that when a tooth of the gear is subjected to repeated stress, the repeated stress is canceled out by compressive stress to prevent surface cracks in the surface of a tooth root and improve a strengthening rate of the gear, the residual stress in a region at a depth of 50 μm or more but 150 μm or less from the surface is −1000 MPa or more to prevent inner cracks and restrain tooth-tip chipping, and the residual stress in a region at a depth of more than 150 μm but 230 μm or less is −800 MPa or less so that the residual stress cancels out hertz stress caused by contact of the teeth of the gears.
(2) In the gear described in (1), preferably, the region at a depth of 50 μm or more but 150 μm or less from the surface is subjected to a shot peening treatment using shot particles, and the region at a depth of 5 μm or more but 20 μm or less from the surface is subjected to a shot peening treatment using shot particles with a smaller particle diameter and a larger hardness than said shot particles.

Effects of the Invention

Operations and effects of the gear according to the present invention will be explained below.
(1) In the gear strengthened by applying residual stress to the gear having a carburized surface, the residual stress in the region at a depth of 5 μm or more but 20 μm or less from the surface is −1400 MPa or less so that when a tooth of the gear is subjected to repeated stress, the repeated stress is canceled out by compressive stress to prevent surface cracks in the surface of a tooth root and improve a strengthening rate of the gear. Further, the residual stress in the region at a depth of 50 μm or more but 150 μm or less from the surface is −1000 MPa or more to prevent inner cracks and restrain tooth-tip chipping, and the residual stress in a region at a depth of more than 150 μm but 230 μm or less is −500 MPa or less so that the residual stress cancels out hertz stress caused by contact of the teeth of the gears. To be concrete, the residual stress in the region at a depth of from 5 μm to 20 μm from the surface is −1400 MPa or less (1400 MPa or more in terms of compressive stress) for the fatigue fracture of a tooth root (dedendum). When the teeth are subjected to repeated loading (stress), therefore, this stress is canceled out by the compressive stress. Thus, no cracks occur in the surface of a tooth root. This can prevent tooth-root fatigue fracture.

In addition, since the residual stress in the region at a depth of from 50 μm to 150 μm from the surface is adjusted to −1000 MPa or more, no inner cracks occur. Thus, the occurrence of tooth-tip chipping can be avoided.
(2) The region at a depth of 50 μm or more but 150 μm or less from the surface is subjected to a shot peening treatment using shot particles, and the region at a depth of 5 μm or more but 20 μm or less from the surface is subjected to a shot peening treatment using shot particles with a smaller particle diameter and a larger hardness than said shot particles so that the residual stress in the region at a depth of 50 μm or more but 150 μm or less from the surface is adjusted to −1000 MPa or more. Thus, no cracks occur and the occurrence of tooth-tip chipping can be prevented.

DETAILED DESCRIPTION

A detailed description of a preferred embodiment of a gear embodying the present invention and a method for manufacturing the gear will now be given referring to the accompanying drawings.

First Embodiment

A manufacturing process in which shot peening is performed on a gear in a first embodiment will be explained.

Before a shot peening treatment, a gear which is a mechanical part is subjected to a carburizing treatment. In the carburizing treatment, when a carburized material is held at a temperature equal to or higher than a transformation point, carbon enters from the surface of the gear. When this is quenched, only a carburized portion is hardened. The carburizing treatment is similar to a conventional art and hence is not explained herein. In some cases, a nitriding treatment is performed in addition to the carburizing treatment.

(Shot Peening Treatment)

A shot peening treatment is performed on the gear subjected to the carburizing treatment. This shot peening treatment, which is an essential feature of the invention, is explained in detail below.

The shot peening treatment is confirmed to have an advantage that remarkably increases fatigue strength, and is widely used. For instance, high pressure air or high pressure water jet is used to accelerate shot particles so that the shot particles are injected through a nozzle to impact or shot peen the part, thereby generating compression residual stress in the part.

The shot peening treatment is an effective treatment because it can control a depth of residual stress and a peak value according to particle diameter and hardness of shot particles and also provide a wide controllable range. This shot peening treatment can control the residual stress for a depth ranging from a top surface to 400 μm and the residual stress for a peak value ranging −800 MPa to −1600 MPa.

To be concrete, increasing the hardness of shot particles can increase a value of residual stress to be generated. When the particle diameter of the shot particles is set to be large, a peak of the residual stress can be adjusted to a deep position from the surface of a part. On the other hand, when the particle diameter of the shot particles is set to be small, a peak of the residual stress can be adjusted to a shallow position from the surface of a part.

In the first embodiment, the shot peening process is carried out in the order of the shot peening B-treatment process and the shot peening C-treatment process. The shot peening treatment is conducted, beginning with a deeper area from the surface.

(Shot Peening B-Treatment Process)

In the shot peening B-treatment, residual stress is applied to a region at a depth of 50 μm or more but 150 μm or less from the surface.

Figure 2:
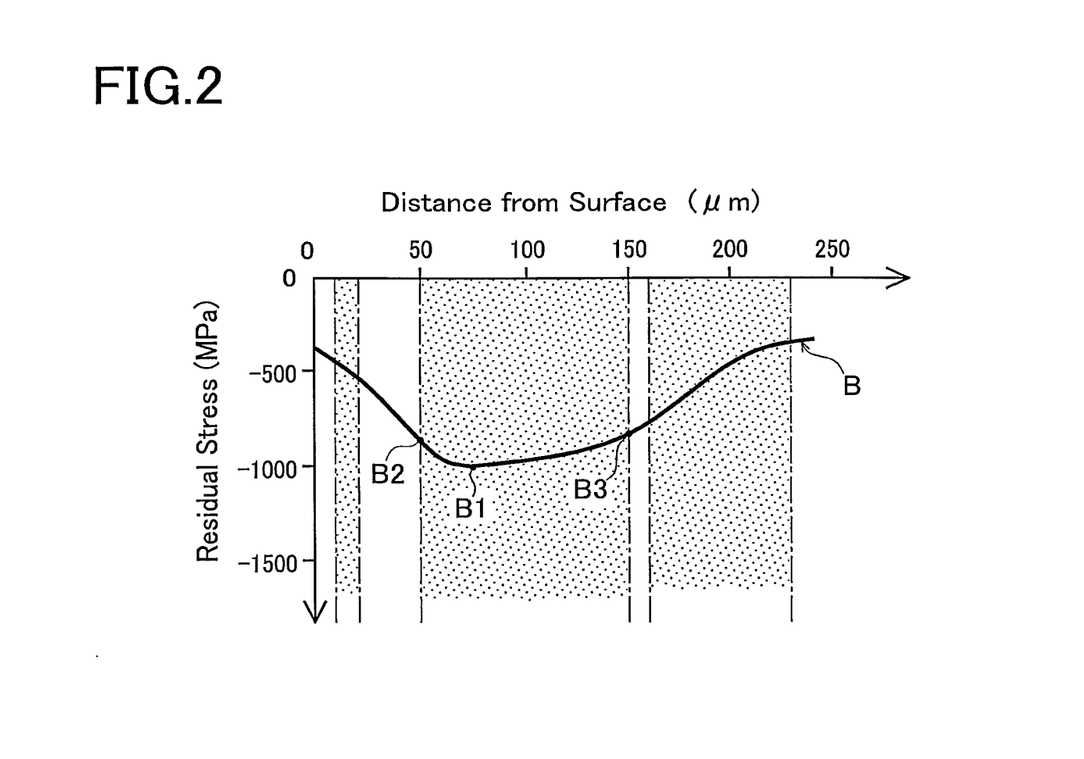
FIG. 2 is a distribution diagram of residual stress in a gear in the shot peening B-process.

FIG. 2 is a distribution diagram of the residual stress in the shot peening B-treatment. The residual stress was measured with an X-ray stress analyzer (Rigaku Corporation) (residual stress measurements in other distribution diagrams were similarly conducted). In the present embodiment, in the shot peening B-treatment, the residual stress in a region at a depth of 50 μm or more but 150 μm or less from the surface is adjusted to −1000 MPa or more to prevent chipping of a tooth tip. When the residual stress in the region at a depth of 50 μm or more but 150 μm or less from the surface can be adjusted to −1000 MPa or more, a residual stress of −1000 MPa or less that may cause inner cracks does not exist. Therefore, because of the absence of inner cracks, it is possible to prevent tooth-tip chipping.

In the shot peening B-treatment, the particle diameter of shot particles is set to 1 mm. Since the particle diameter of short particles is set to 1 mm, as shown in FIG. 2, the peak position of residual stress can be adjusted to a position at 50 μm or more but 150 μm or less below the surface.

The hardness of shot particles is set to HV450. With this hardness HV450 of shot particles, the residual stress can be adjusted to a value, −1000 MPa or more, as shown in FIG. 2. To be specific, as shown in FIG. 2, the residual stress is indicated by a solid line B. This solid line B shows that the residual stress is −1000 MPa at a depth of 80 μm from the surface, which is a peak position indicated by B1. The residual stress in a position B2 at a depth of 50 μm from the surface is −900 MPa and the residual stress in a position B2 at a depth of 150 μm from the surface is −850 MPa. Therefore, in a region at a depth of 50 μm or more but 150 μm or less from the surface, the residual stress ranges from −850 MPa to −1000 MPa.

As above, when the particle diameter of shot particles is set to 1 mm and the hardness is set to HV450, the region at a depth of 50 μm or more but 150 μm or less from the surface can have a residual stress of −1000 MPa or more.

Although the particle diameter is set to 1 mm in the present embodiment, it is experimentally confirmed that any particle diameter of 0.8 mm or more but 1.2 mm or less with a hardness of HV450 can achieve the residual stress of −1000 MPa or more in the region at a depth of 50 μm or more but 150 μm or less from the surface.

(Shot Peening C-Treatment Process)

Figure 3:
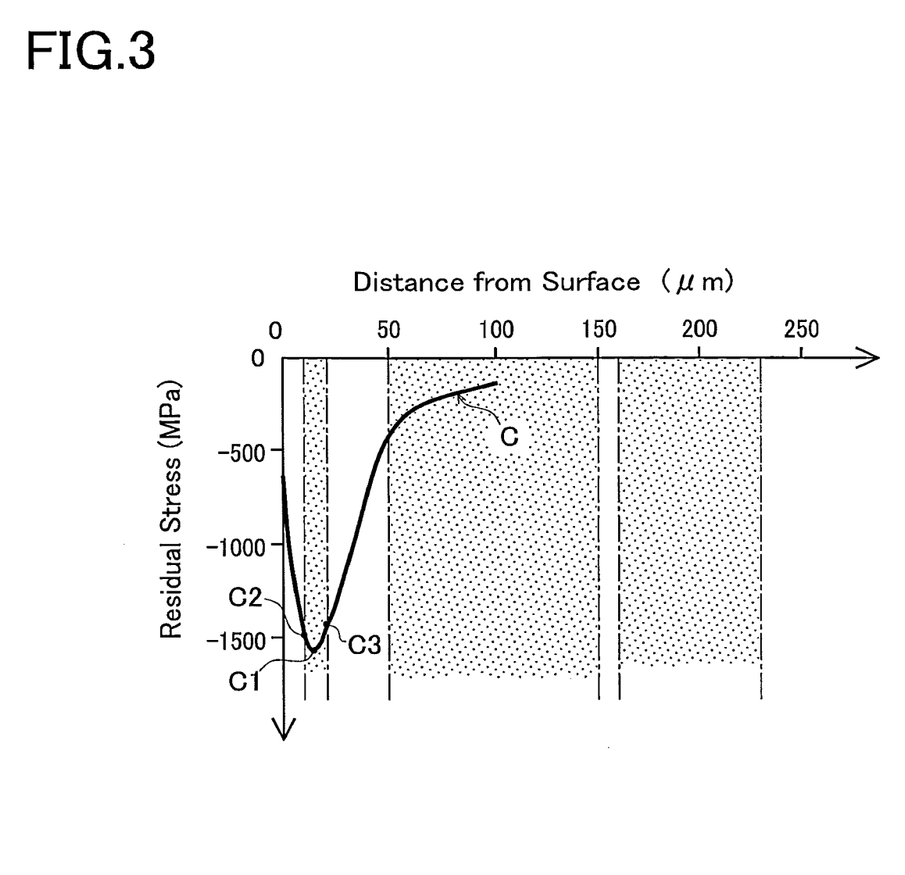
FIG. 3 is a distribution diagram of residual stress in a gear in the shot peening C-process.

In the shot peening C-treatment, residual stress is applied to a region at a depth of 5 μm or more but 20 μm or less from the surface. This is because the region at a depth of 5 μm or more but 20 μm or less is subjected to tooth-root bending fatigue and thus needs improved strength. FIG. 3 is a distribution diagram of residual stress in the shot peening C-treatment.

In the present embodiment, in the shot peening C-treatment, the residual stress in the region at a depth of 5 μm or more but 20 μm or less from the surface is adjusted to −1500 MPa or less in order to improve the strength of a portion which is likely to be subjected to tooth-root bending fatigue stress. Since the residual stress in the region at a depth of 5 μm or more but 20 μm or less from the surface can be adjusted to −1500 MPa or less, when repeated loading (stress) is imparted on a tooth or teeth, the stress is canceled out by compressive stress. This can prevent the occurrence of cracks in the surface(s) of a tooth or teeth root(s) and avoid tooth-root fatigue fracture. In the present embodiment, of course, the residual stress adjusted to −1500 MPa or less also includes a residual stress of −1000 MPa or less.

Figure 4:
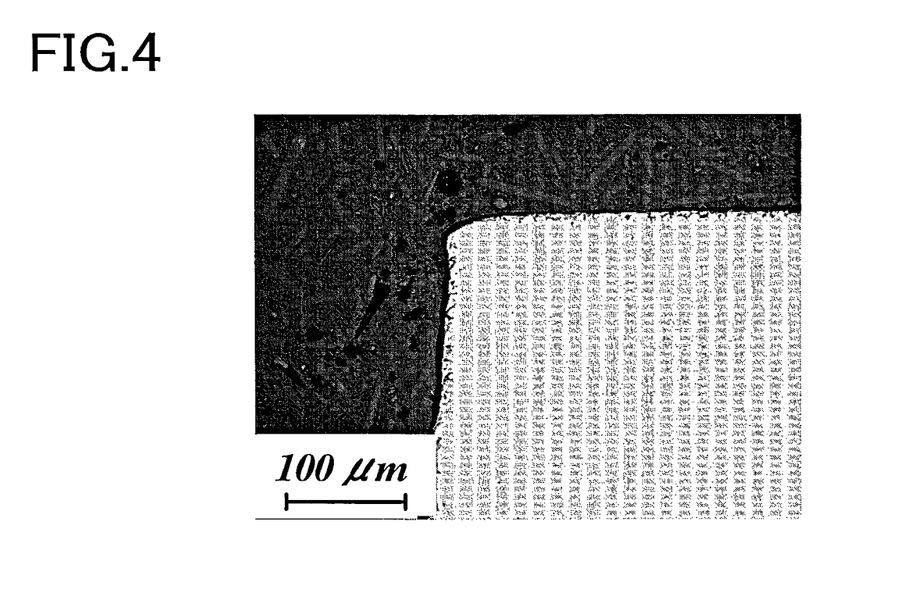
FIG. 4 is a micrograph with a scale showing a photographed cross section of a tooth tip of a gear having been subjected to the shot peening B-process and the shot peening C-process.

In the shot peening C-treatment, the particle diameter of shot particles is set to 0.2 mm. With the particle diameter of shot particles set to 0.2 mm, as shown in FIG. 4, a peak of residual stress can be adjusted to a position at a depth of 5 μm or more but 20 μm or less.

The hardness of shot particles is also set to HV800. With the hardness of shot particles set to HV800, as shown in FIG. 3, the residual stress can be increased to a value, −1400 MPa or less.

To be concrete, as shown in FIG. 3, the residual stress is indicated by a solid line C. This solid line C shows that residual stress is −1600 MPa at a depth of 15 μm from the surface, which is a peak position indicated by C1. The residual stress in a position C2 at a depth of 5 μm from the surface is −1500 MPa and the residual stress in a position C3 at a depth of 20 μm from the surface is −1400 MPa. Therefore, in the region at a depth of 5 μm or more but 20 μm or less from the surface, which needs residual stress enough to prevent tooth-root bending fatigue, the residual stress can be kept at a high residual stress of −1400 MPa to −1600 MPa.

As above, when the particle diameter of shot particles is set to 0.2 mm and the hardness is set to HV800, the region at a depth of 5 μm or more but 20 μm or less from the surface can have a residual stress of 1400 MPa or less.

Although the particle diameter is set to 0.2 mm in the present embodiment, it is experimentally confirmed that any particle diameter of 0.2 mm or more but 0.3 mm or less with a hardness of HV800 can achieve the residual stress of −1400 MPa or less in the region at a depth of 5 μm or more but 20 μm or less from the surface.

(Advantageous Effects of Gear Subjected to Shot Peening B-Treatment and Shot Peening C-Treatment)

Figure 1:
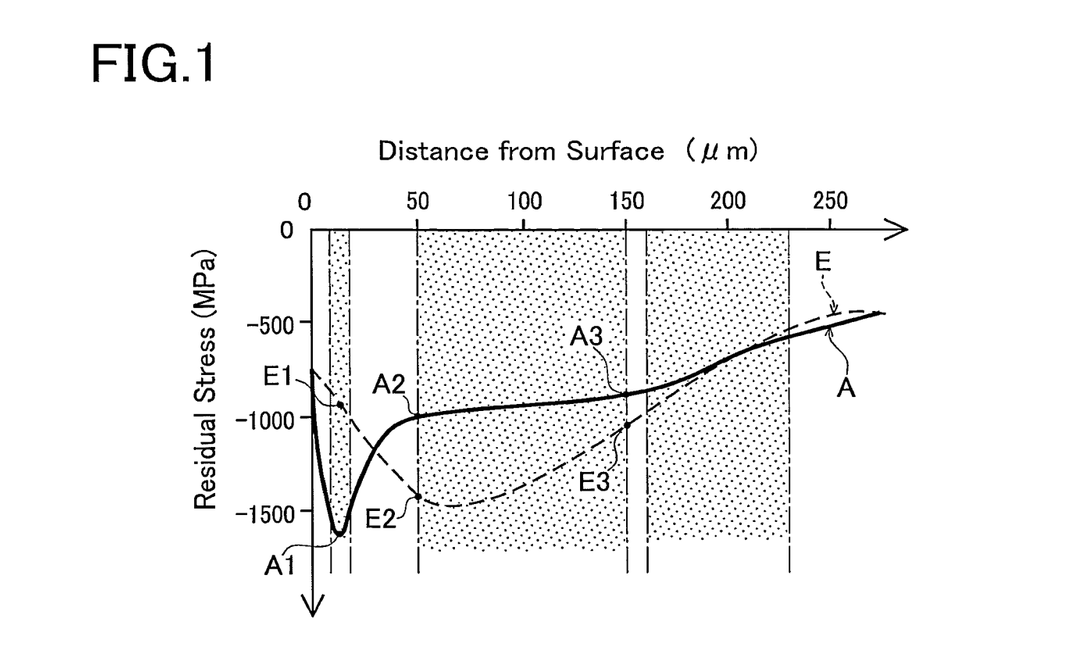
FIG. 1 is a distribution diagram of residual stress after a shot peening B-process and a shot peening C-process are performed.

FIG. 1 shows a distribution diagram of residual stress in a gear subjected to the shot peening B-treatment and the shot peening C-treatment in the present embodiment. In FIG. 1, a solid line A indicates residual stress in a gear in the present embodiment, and a broken line E3 indicates residual stress in a gear subjected to the conventional shot peening treatment test (1) conducted to increase tooth-root bending fatigue strength of the gear as shown in FIG. 12. The solid line A is depicted as a combination of the distribution diagrams obtained when the shot peening B-treatment and the shot peening C-treatment are performed.

As shown in FIG. 1, in the solid line A, the residual stress is −1600 MPa or less at A1, which is likely to be subjected to tooth-root bending fatigue, corresponding to a depth of 5 μm or more but 20 μm or less from the surface. This residual stress is larger by −650 MPa or more than a residual stress of −950 MPa at E1 of the broken line E corresponding to the depth of 5 μm or more but 20 μm or less from the surface.

Accordingly, the residual stress in the region at a depth of 5 μm or more but 20 μm or less from the surface is 1400 MPa or less (1400 MPa or more in terms of compressive stress) with respect to tooth-root fatigue stress. When repeated loading (stress) is imparted on a tooth or teeth, the stress is canceled out by the compressive stress. This can prevent the occurrence of inner cracks in the surface of a tooth root and avoid tooth-root fatigue fracture.

As shown in FIG. 1, in the solid line A, a region A2 to A3, which may cause inner cracks, corresponding to the depth of 50 μm or more but 150 μm or less from the surface has a residual stress of −1000 MPa or more. This residual stress is not so large as that in the region at a depth of 50 μm or more but 150 μm or less from the surface indicated by the broken line E. Thus, the region A2 to A3 is lower in strength than the broken line E. However, the residual stress of −1000 MPa or more is not so large but is sufficient to keep the strength of a gear. Therefore, the gear strength can be sufficiently maintained.

In the case where a residual stress of −1500 MPa or less exits as in a region E2 to E3 of the broken line E, inner cracks occur, leading to tooth-tip chipping. In the region A2 to A3, having a residual stress of −1000 MPa or more, no inner cracks occur and hence tooth-tip chipping is not caused.

Figure 5:
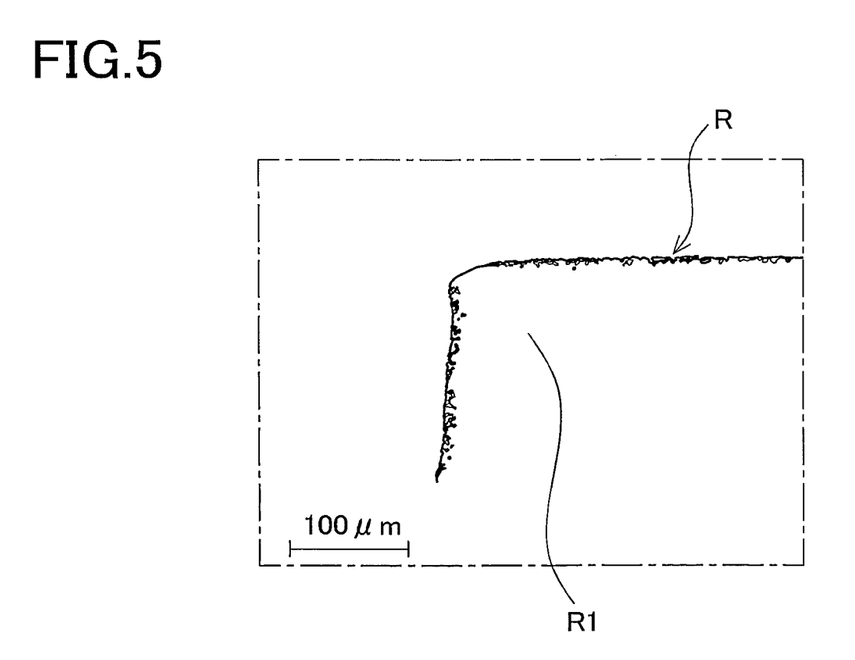
FIG. 5 is a diagram corresponding to the micrograph shown in FIG. 4.

FIG. 4 is a micrograph with a scale of a photographed cross section of a tooth tip of a gear 1 having been subjected to the shot peening B-treatment and the shot peening C-treatment. FIG. 5 is a diagram corresponding to the micrograph shown in FIG. 4.

Figure 10:
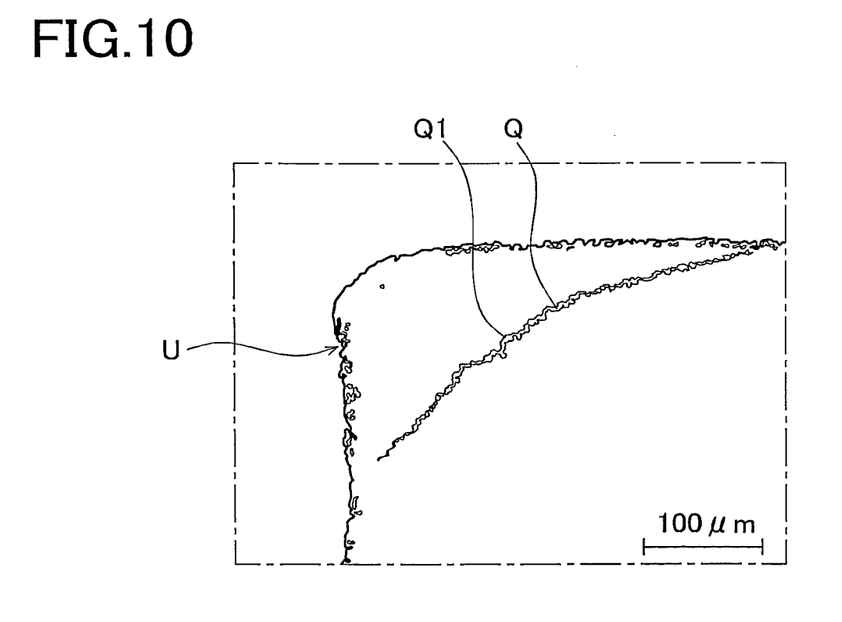
FIG. 10 is a diagram corresponding to the micrograph shown in FIG. 9.

As shown in FIG. 5, in a region R1 located at a depth of 100 μm from the surface R of the gear 1 subjected to the shot peening B-treatment and the shot peening C-treatment, such inner cracks Q as shown in FIG. 10 did not occur.

According to the present embodiment in which the shot peening B-treatment and the shot peening C-treatment are performed, furthermore, inner cracks did not occur in all of eight gears as shown in FIG. 13. Accordingly, the occurrence of inner cracks can be prevented and thus tooth-tip chipping can be avoided.

Second Embodiment

A gear and a method for manufacturing the gear in a second embodiment is substantially identical to the gear and the gear manufacturing method in the first embodiment excepting that a shot peening A-treatment is performed in addition to the shot peening B-treatment and the shot peening C-treatment. The second embodiment is therefore explained about residual stress of a final gear having been subjected to the shot peening B-treatment and the shot peening C-treatment. Other explanations are thus omitted. The shot peening A-treatment is carried out before the shot peening B-treatment and the shot peening C-treatment. In the second embodiment, therefore, the shot peening process is performed in the order of the shot peening A-treatment, the shot peening B-treatment, and the shot peening C-treatment.

The second embodiment, omitting other explanations, can provide the same operations and effects as those in the first embodiment.

(Shot Peening A-Treatment)

Figure 7:
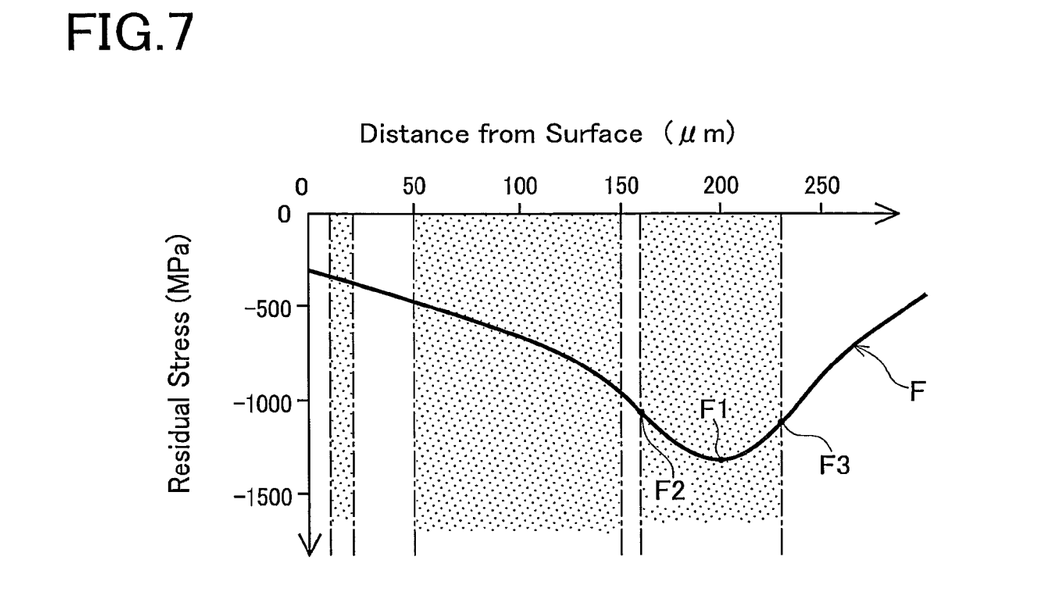
FIG. 7 is a distribution diagram of residual stress in a gear in the shot peening A-process.

In the shot peening A-treatment, residual stress is applied to a region at a depth of more than 160 μm but 230 μm or less from the surface. This is because the region corresponding to the depth of more than 160 μm but 230 μm or less from the surface is likely to be subjected to contact pressure fatigue during gear operation and thus needs improved strength. FIG. 7 shows a distribution diagram of residual stress in the shot peening A-treatment.

In the shot peening A-treatment, the particle diameter of shot particles is set to 2 mm. With the particle diameter of shot particles set to 2 mm, a peak of the residual stress can be adjusted to a position at a depth of more than 160 μm but 230 μm or less from the surface as shown in FIG. 7.

The hardness of shot particles is set to HV700. With the hardness of shot particles set to HV700, the residual stress of in the region corresponding to the depth of more than 160 μm but 230 μm or less from the surface can be increased to a value, −1200 MPa or less, as shown in FIG. 7.

As above, when the particle diameter of shot particles is set to 2 mm and the hardness is set to HV700, the region at a depth of more than 160 μm but 230 μm or less from the surface can have a residual stress of −1000 MPa or less.

To be concrete, as shown in FIG. 7, the residual stress is indicated by a solid line F. This solid line F shows that the residual stress is −1300 MPa at a depth of more than 160 μm but 230 μm or less from the surface, which is a peak position indicated by F1.

The residual stress in a position F2 at a depth of 160 μnm from the surface is −1000 MPa and the residual stress in a position F3 at a depth of 230 μm from the surface is −1050 MPa. Therefore, in the region at a depth of more than 160 μm but 230 μm or less from the surface, which needs residual stress enough to prevent tooth-root bending fatigue, the residual stress can be kept at a high residual stress of −1000 MPa to −1300 MPa.

Accordingly, when the particle diameter of shot particles is set to 2 mm and the hardness is set to HV700, the region at a depth of more than 160 μm but 230 μm or less from the surface can have a residual stress of −1200 MPa or less.

Furthermore, the residual stress in a position at a depth of 150 μm from the surface is −900 MPa and the residual stress in a position F3 at a depth of 230 μm from the surface is −1050 MPa. Thus, in the region at a depth of more than 150 μm but 230 μm or less from the surface, needing residual stress enough to prevent tooth-root bending fatigue, the residual stress can be kept at a high residual stress of −900 MPa to −1300 MPa.

In the present embodiment, the region at a depth of more than 150 μm but 230 μm or less from the surface is adjusted to −900 MPa or less. However, the present applicants experimentally confirmed that even when the region at a depth of more than 150 μm but 230 μm or less from the surface is adjusted to −500 MPa, sufficient contact pressure fatigue strength can be maintained.

(Advantageous Effects of Gear Subjected to Shot Peening A-Treatment Through Shot Peening C-Treatment)

Figure 6:
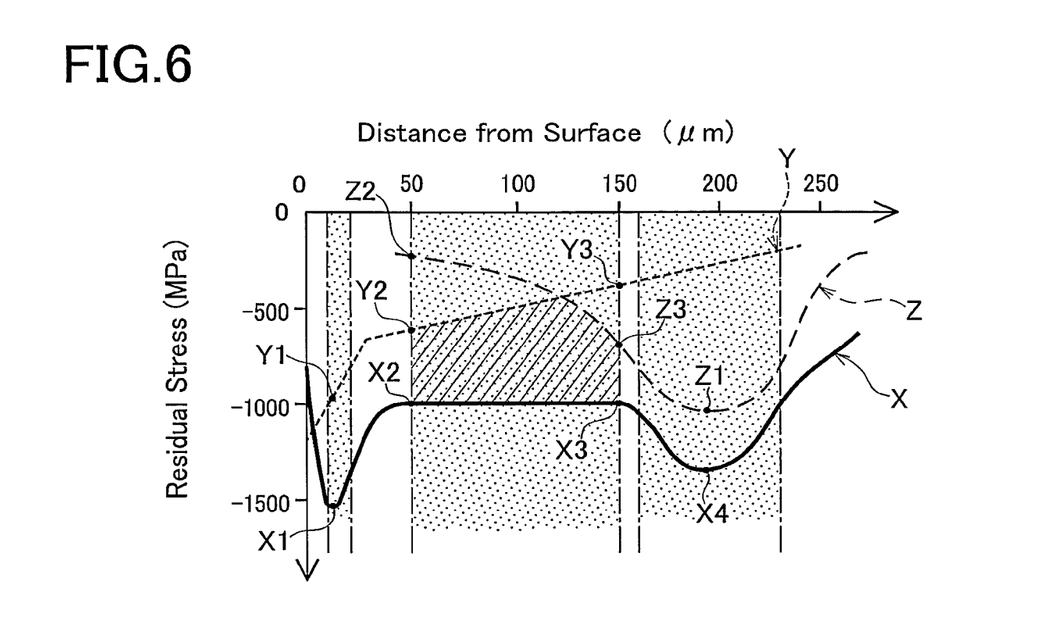
FIG. 6 is a distribution diagram of residual stress in a gear subjected to a shot peening A-process and the shot peening C-process.

FIG. 6 is a distribution diagram of residual stress in a gear subjected to the shot peening A-treatment through the shot peening C-treatment.

In FIG. 6, a solid line X indicates residual stress in a gear in the present embodiment, a first broken line Y indicates bending load stress, and a second broken line Z indicates load stress to contact or surface pressure. The solid line X is depicted as a combination of distribution diagrams obtained when the shot peening A-treatment through the shot peening C-treatment are performed.

The residual stress of bending load stress at Y1 of the first broken line Y, located at a depth of 5 μm or more but 20 μm or less from the surface, is −1000 MPa. On the other hand, the residual stress at X1 of the solid line X, located at a depth of 5 μm or more but 20 μm or less from the surface, corresponding to Y1, is −1500 MPa. Accordingly, after the aforementioned shot peening A-treatment is performed, the residual stress in a portion of the gear at a depth of 5 μm or more but 20 μm or less from the surface is larger by −500 MPa than the bending load stress.

Therefore, the residual stress in the region at a depth of 5 μm or more but 20 μm or less from the surface is −1400 MPa or less (1400 MPa or more in terms of compressive stress) with respect to tooth-root fatigue fracture. Thus, when repeated loading (stress) is imparted on a tooth or teeth, this stress is canceled out by the compressive stress. This can prevent the occurrence of cracks in the surface of a tooth root and avoid tooth-root fatigue fracture.

Furthermore, even when the residual stress of bending load stress at Y1 at a depth of 5 μm or more but 20 μm or less from the surface is −1000 MPa or less, the residual stress is not smaller than the load stress to bending. Thus, when the teeth are subjected to repeated loading (stress), this stress is canceled out by the compressive stress. This can prevent the occurrence of cracks in the surface of a tooth root and thus avoid tooth-root fatigue fracture.

As shown in FIG. 6, the residual stress of load stress to contact pressure at a maximum point Z1 of the second broken line Z in a range of the depth of more than 160 μm but 230 μm or less from the surface is −1000 MPa or less. On the other hand, the residual stress at X4 of the corresponding solid line X at a depth of more than 160 μm but 230 μm or less from the surface is −1000 MPa or less. Accordingly, when the aforementioned shot peening A-treatment is performed, the residual stress in a portion of the gear at a depth of more than 160 μm but 230 μm or less from the surface is not smaller than the load stress to contact pressure.

Accordingly, the hertz stress (a maximum value thereof in a gear exists near at a depth of 200 μm from the surface) that occurs by contact between teeth surfaces can be canceled out. This can improve the contact pressure fatigue strength.

In the present embodiment, the residual stress of the second broken line Z1 is adjusted to −1000 MPa. On the other hand, the size of load stress to contact pressure depends on the size and others of a gear. The present applicants therefore carried out experiments on various-sized gears and experimentally confirmed that the contact pressure fatigue strength could be kept if the residual stress of load stress to contact pressure is −500 MPa or less at the depth of more than 150 μm but 230 μm from the surface.

As shown in FIG. 6, the load stress of bending load stress at Y2 of the first broken line Y in a region at a depth of 50 μm or more from the surface is −600 MPa or less. The load stress of surface contact at Z2 of the second broken line Z in a region at a depth of 50 μm or more from the surface is −200 MPa or less. On the other hand, the residual stress at X2 of the solid line X in a region at a depth of 50 μm or more from the surface is −1000 MPa or more.

The bending load stress at Y3 of the first broken line Y in a region at a depth of 150 μm or more from the surface is −450 MPa or more. The load stress of surface contact at Z3 of the second broken line Z in a region at a depth of 150 μm or more from the surface is −700 MPa or more. On the other hand, the residual stress at X3 of the solid line X in a region at a depth of 50 μm or more from the surface is −1000 MPa or more.

Accordingly, in the region at a depth of 50 μm or more but 150 μm or less, the residual stress is adjusted to −1000 MPa or more as shown by the solid line X. The residual stress indicated by the solid line X is larger than the bending load stress indicated by the first broken line Y and the load stress of contact pressure indicated by the second broken line Z.

In the region corresponding to the depth of 50 μm or more but 150 μm or less, where cracks are most likely to occur, from the surface, it has a low probability of occurrence of inner cracks and further it is possible to prevent the occurrence of tooth-tip chipping.

The gear of the present invention and the gear manufacturing method are not limited to the above embodiments and may be embodied in other specific forms without departing from the essential characteristics thereof.

For instance, the above embodiments perform the shot peening treatment, but may also adopt other techniques such as wet blast, ultrasonic shot, and heavy working.

Since the residual stress in the region at a depth of more than 150 μm but 300 μm or less from the surface is not increased uniformly from a peak of the residual stress in the region at a depth of 150 μm or less from the surface, the hertz stress (a maximum value thereof in a gear exists near at a depth of 200 μm from the surface) that occurs by contact between teeth surfaces can be canceled out. This can improve the contact pressure fatigue strength.

In the method for manufacturing the gear strengthened in such a manner that the residual stress is applied by the shot peening to the gear having a surface subjected to the carburizing treatment, there is included the shot peening C-treatment process to shot peen the gear by use of shot particles with a particle diameter of 0.3 mm or less so that the residual stress in the region at a depth of 5 μm or more but 20 μm or less from the surface is −1000 MPa or less. Since the residual stress is −1000 MPa or less (1000 MPa or more in terms of compressive stress) in the region at a depth of 5 μm or more but 20 μm or less from the surface with respect to the tooth-root fatigue fracture. When the tooth or teeth are subjected to repeated load (stress), the stress is canceled out by the compressive stress. Thus, no cracks occur in the surface of the tooth root. This can prevent the tooth-root fatigue fracture.

To obtain a residual stress of −1000 MPa or more in the region at a depth of 50 μm or more but 150 μm or less from the surface, the shot peening B-treatment process is carried out to shot peen the gear by use of shot particles with a particle diameter of 0.8 mm or more but 1.2 mm or less and the shot peening C-treatment process is conducted following the shot peening B-treatment process. Since the residual stress in the region at a depth of 50 μm or more but 150 μm or less from the surface is −1000 MPa or more, no inner cracks occur and thus the generation of tooth-tip chipping can be prevented.

To obtain a residual stress of −1200 MPa or less in the region at a depth of more than 150 μm but 230 μm or less from the surface, the shot peening A-treatment process is carried out to shot peen the gear by use of shot particles with a particle diameter of 1.5 mm or more and the shot peening C-treatment process is conducted following the shot peening A-treatment process. Accordingly, the hertz stress (a maximum value thereof in a gear exists near at a depth of 200 μm from the surface) that occurs by contact between teeth surfaces can be canceled out. This can improve the contact pressure fatigue strength.

Since the shot peening B-treatment process is carried out after the shot peening A-treatment process, the residual stress in the region at a depth of 5 μm or more but 20 μm or less from the surface is −1000 MPa or less (1000 MPa in terms of compressive stress) with respect to the teeth root fatigue fracture. When the tooth or teeth are subjected to repeated load (stress), this stress is canceled out by the compressive stress. No cracks therefore occur in the surfaces of a tooth root. This can prevent tooth-root fatigue fracture.

Furthermore, since the residual stress in the region at a depth of 50 μm or more but 150 μm or less from the surface is −1000 MPa or more, no cracks occurs and thus the generation of tooth-tip chipping can be prevented.

Since the hertz stress (a maximum value thereof in a gear exists near at a depth of 200 μm from the surface) that occurs by contact between teeth surfaces can be canceled out, the contact pressure fatigue strength can be improved.

REFERENCE SIGNS LIST

R Surface

The invention claimed is:

1. A method of manufacturing a gear, comprising the steps of:
   subjecting the gear to a carburizing treatment so that a carbon surface is formed on the gear; and
   applying residual stress to the gear in order to strengthen the gear,
   wherein the gear has:
   (i) a region located at a depth of 50 μm or more but 150 μm or less from the surface and subjected to a shot peening treatment using first shot particles;
   (ii) a region located at a depth of 5 μm or more but 20 μm or less from the surface and subjected to a shot peening treatment using second shot particles with a smaller particle diameter and a larger hardness than the first shot particles; and
   (iii) a region located at a depth of 150 μm or more but 230 μm or less from the surface and subjected to a shot peening treatment using third shot particles with a larger particle diameter than the first shot particles,
   wherein the residual stress in the region (ii) is −1400 MPa or less, so that when a tooth of the gear is subjected to repeated stress, the repeated stress is canceled out by compressive stress to prevent surface cracks in the surface of a tooth root and improve a strengthening rate of the gear,
   the residual stress in the region (i) is −1000 MPa or more to prevent inner cracks and restrain tooth-tip chipping, and
   the residual stress in the region (iii) is −800 MPa or less in the whole region (iii) so that the residual stress cancels out hertz stress caused by contact of the teeth of the gears.

2. The method of manufacturing the gear of claim 1, wherein, the residual stress in any depth within region (iii) is −800 MPa or less so that the residual stress cancel out hertz stress caused by contact of the gears.

* * * * *